US010257251B1

(12) United States Patent
Leblang

(10) Patent No.: US 10,257,251 B1
(45) Date of Patent: Apr. 9, 2019

(54) SYSTEMS AND METHODS FOR USING A UNIFORM RESOURCE LOCATOR TO CALL FOR DIFFERENT TYPES OF CONTENT

(71) Applicant: Amazon Technologies, Inc., Seattle, WA (US)

(72) Inventor: Jonathan A. Leblang, Menlo Park, CA (US)

(73) Assignee: Amazon Technologies, Inc., Reno, NV (US)

( * ) Notice: Subject to any disclaimer, the term of this patent is extended or adjusted under 35 U.S.C. 154(b) by 415 days.

(21) Appl. No.: 14/710,378

(22) Filed: May 12, 2015

Related U.S. Application Data

(63) Continuation of application No. 13/626,389, filed on Sep. 25, 2012, now Pat. No. 9,032,045.

(51) Int. Cl.
*G06F 15/16* (2006.01)
*H04L 29/08* (2006.01)
*G06F 17/30* (2006.01)
*G06F 3/0484* (2013.01)
*G06F 3/0482* (2013.01)

(52) U.S. Cl.
CPC ............ *H04L 67/02* (2013.01); *G06F 3/0482* (2013.01); *G06F 3/04842* (2013.01); *G06F 17/30887* (2013.01)

(58) Field of Classification Search
CPC ......... G06F 17/30569; G06F 17/30887; G06F 3/0482; G06F 3/04842; H04L 67/02; H04L 67/125; H04L 67/306
USPC .......................................................... 709/217
See application file for complete search history.

(56) References Cited

U.S. PATENT DOCUMENTS

| 6,134,598 | A   | 10/2000 | Raman |
|-----------|-----|---------|-------|
| 7,000,242 | B1  | 2/2006  | Haber |
| 7,016,963 | B1  | 3/2006  | Judd et al. |
| 7,506,265 | B1  | 3/2009  | Traut et al. |
| 7,703,013 | B1* | 4/2010  | Bauermeister .... G06F 17/30873 715/255 |
| 7,752,202 | B2  | 7/2010  | Kobori et al. |
| 8,578,261 | B1  | 11/2013 | Gupta et al. |
| 9,002,864 | B1* | 4/2015  | Payne ............... G06F 17/30876 707/756 |

(Continued)

OTHER PUBLICATIONS

Kyle Miller, "Web-to-app interoperability: Launch your Android app from the web," Mar. 2012, Tech Republic, http://www.techrepublic.com/blog/software-engineer/web-to-app-interoperability-launch-your-android-app-from-the-web/.*

*Primary Examiner* — Ruolei Zong
(74) *Attorney, Agent, or Firm* — Eversheds Sutherland (US) LLP

(57) ABSTRACT

This disclosure relates to systems and methods for using a uniform resource locator to retrieve content for both a first application and a second application. The user may elect to use the first or second application to view content associated with the uniform resource locator. In one instance, an unmodified uniform resource locator may be parsed for identifiers that may be used to retrieve content for the second application instead of the content for the first application. In another instance, a modified uniform resource locator may be appended with a second application scheme and a path for the content of the second application address. In both instances, the unmodified and the modified uniform resource locators may be used to retrieve content for the first application or the second application.

21 Claims, 10 Drawing Sheets

(56) References Cited

U.S. PATENT DOCUMENTS

| | | | | |
|---|---|---|---|---|
| 9,280,789 B2* | 3/2016 | Kirkham | ............ | G06Q 30/0631 |
| 2004/0012627 A1* | 1/2004 | Zakharia | ........... | G06F 17/30905 |
| | | | | 715/744 |
| 2008/0307477 A1* | 12/2008 | Omernick | .......... | H04N 7/17318 |
| | | | | 725/109 |
| 2009/0313337 A1* | 12/2009 | Jin | ......................... | G06Q 10/10 |
| | | | | 709/206 |
| 2013/0111328 A1* | 5/2013 | Khanna | ............... | G06F 17/3089 |
| | | | | 715/234 |
| 2013/0124606 A1* | 5/2013 | Carpenter | ............... | H04L 67/06 |
| | | | | 709/203 |
| 2013/0282755 A1* | 10/2013 | Procopio | ........... | G06F 17/30126 |
| | | | | 707/770 |
| 2014/0068006 A1 | 3/2014 | Singhal et al. | | |

* cited by examiner

```
┌─────────────────────────────────────────────────────────────┐
│  GENERATE A CONTENT LINK COMPRISING A FIRST UNIFORM RESOURCE LOCATOR │
│  SCHEME ASSOCIATED WITH A PATH TO CONTENT IN A FIRST FORMAT, AND A SECOND │
│  UNIFORM RESOURCE LOCATOR SCHEME ASSOCIATED WITH AN IDENTIFIER FOR THE │
│                    CONTENT IN A SECOND FORMAT                │
│                             1002                             │
└─────────────────────────────────────────────────────────────┘
                              │
                              ▼
┌─────────────────────────────────────────────────────────────┐
│  RECEIVE A REQUEST FOR THE CONTENT IN THE SECOND FORMAT, THE REQUEST │
│  COMPRISING THE IDENTIFIER ASSOCIATED WITH CONTENT IN THE SECOND FORMAT │
│                             1004                             │
└─────────────────────────────────────────────────────────────┘
                              │
                              ▼
┌─────────────────────────────────────────────────────────────┐
│         SEND THE CONTENT IN THE SECOND FORMAT TO A USER DEVICE │
│                             1006                             │
└─────────────────────────────────────────────────────────────┘
```

FIG. 10

SYSTEMS AND METHODS FOR USING A UNIFORM RESOURCE LOCATOR TO CALL FOR DIFFERENT TYPES OF CONTENT

RELATED APPLICATIONS

This application is a continuation of U.S. patent application Ser. No. 13/626,389, filed Sep. 25, 2012 and titled SYSTEMS AND METHODS FOR USING A UNIFORM RESOURCE LOCATOR TO CALL FOR DIFFERENT TYPES OF CONTENT, which is hereby incorporated by reference in its entirety.

BACKGROUND

Users may navigate to specific content items by entering a uniform resource locator address into an Internet browser application or by selecting a navigation link embedded within Internet browser content. The navigation link may include a reference to the uniform resource locator. When selected by a user, the navigation link directs the Internet browser application to the content associated with that path. Typically, content has been viewed using Internet browser applications that execute instructions written in markup languages. As a result, content distribution using navigation links that include the uniform resource locators has become widespread. However, the recent growth in mobile applications has expanded the opportunities to display content in new ways unsupported by existing markup languages.

BRIEF DESCRIPTION OF THE DRAWINGS

FIG. 10 illustrates a flow diagram for a method for providing content for the second application using a modified uniform resource locator in accordance with one or more embodiments of the disclosure.

Figure 1:
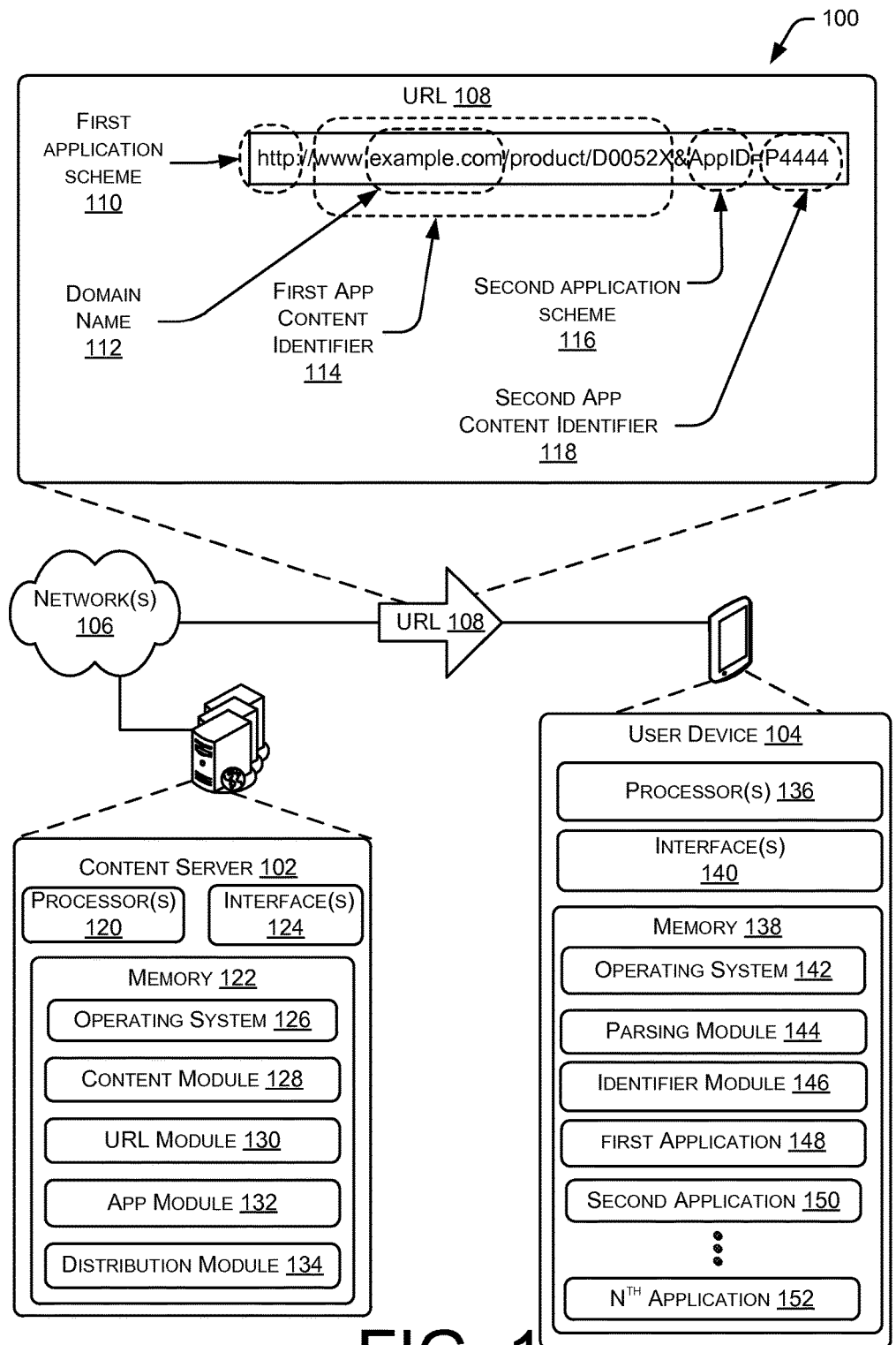
FIG. 1 illustrates a system for distributing content over a network using uniform resource locators to provide access to content that may be compatible with two or more applications on a user device in accordance with one or more embodiments of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art Like numbers in the figures refer to like elements throughout. Hence, if a feature is used across several drawings, the number used to identify the feature in the drawing where the feature first appeared will be used in later drawings.

DETAILED DESCRIPTION

Described herein are systems and methods for providing content based, at least in part, on uniform resource locators that enable a user device to retrieve content for a first application or a second application that may display content on a user device. In one embodiment, the first application may be an internet browser (e.g., Internet Explorer™, Safari™, Firefox™) that uses a virtual machine to execute instructions on a user device. The second application may display content on the user device, but may be configured to execute instructions using the operating system and processor of the user device (e.g., not using a virtual machine). However, the first and second applications may execute certain plug-in programs (e.g., Java™, Flash Player™, Quicktime™ . . . etc.) to display content. The first and second applications may also implement other programs that may perform a specific task or function that enhance the capabilities of the first and second applications. The tasks or functions may include, but are not limited to, virus scanning, encryption, file formatting, programming language interpretation, custom commands, or specialized features for the first and/or second applications.

Online content providers may be able to provide content in more than one format to be displayed using different applications stored on the user device. In some instances, the second application may be able to display additional content elements not supported by the first application. Therefore, online content providers may support content for both types of applications. For example, the second application may be able display higher quality graphics than the first application.

Uniform resource locators may be used to retrieve content from an online content provider. However, uniform resource locators are configured to retrieve content for one type of application. In some instances, the user may want to retrieve content for another type of application. This process may be streamlined by using the uniform resource locator to find the content for the first application and the second application. For example, the uniform resource locator may be parsed to locate content identifiers for the second application without having to open the first application. In another instance, the uniform resource locator may be modified to include content addresses for the second application that enable the user device to retrieve the content without using the first application.

In one embodiment, a user device may analyze an unmodified uniform resource locator to direct the second application to the same or similar content that would be displayed using the first application. After receiving or selecting a uniform resource locator, the analysis may include determining the user device has a second application that is associated with the uniform resource locator. The user device may determine a domain name and an identifier for the content of the first application in the uniform resource locator. The user device may send a request for the content of the second application to the online content provider associated with the domain name. The request may include the identifier of the content of the first application. In response to the request, the online content provider may provide a specific piece of content that includes the same, similar, or the most related content for the second application back to the user device. In this way, the user device may be able to use uniform resource locators to directly access content for second application that would normally provide access to content used by the first application.

In another embodiment, the online content providers may modify the uniform resource locators that are embedded in their websites, emails, or any other hyperlink friendly application. The uniform resource locator may include a first application scheme (e.g., "http" or "https") that may direct the user device to use the first application to view the content referenced in the uniform resource locator. The online content provider may also embed an application scheme in the same uniform resource locator which may indicate that the same or similar content that may also be viewed using the second application. The user device may prompt the user for which application to use to view the content. The user may have also established an application preference when the second application scheme is present. When the second application is selected to view the content, the user device may extract from the uniform resource locator a second application content identifier associated with the second application scheme. When the content provider receives the application content identifier, the content for the second application may be provided to the user device. (See, RFC 1738, December 1994 and dependent RFC as found on www.ietf.org on Sep. 4, 2012).

In another embodiment, the content providers may again provide an unmodified uniform resource locator that may include a first application scheme and a first application content identifier. In this case, the user device may determine that the user prefers to view the content for the second application rather than the content for the first application. When the uniform resource locator is selected, the user device may send a second application content request that includes the uniform resource locator. The content provider may determine that the content for the first application is not desired. The content provider may determine the content for the second application may be the equivalent to the content for the first application based on the received uniform resource locator. Following the identification of the content for the second application, the content provider may provide the content for the second application to the user device instead of the content for the first application.

Illustrative System

FIG. 1 illustrates a system 100 for distributing content from a content server 102 to a user device 104 over a network 106 based at least in part on a uniform resource locator 108. A content provider may administer the content server 102 and may provide any type of online or electronic content to the user devices (e.g., user device 104). The content may include, but is not limited to, news, social media, games, movies, music, retail or commercial information and/or any other content or information that may be transmitted or received over a communications network. Further, the content may be accessible by the first application or a second application using the uniform resource locator 108. Generally, the uniform resource locator 108 may be configured to direct the user device 104 to content that may be compatible with the first application, but not with the second application.

Figure 4:
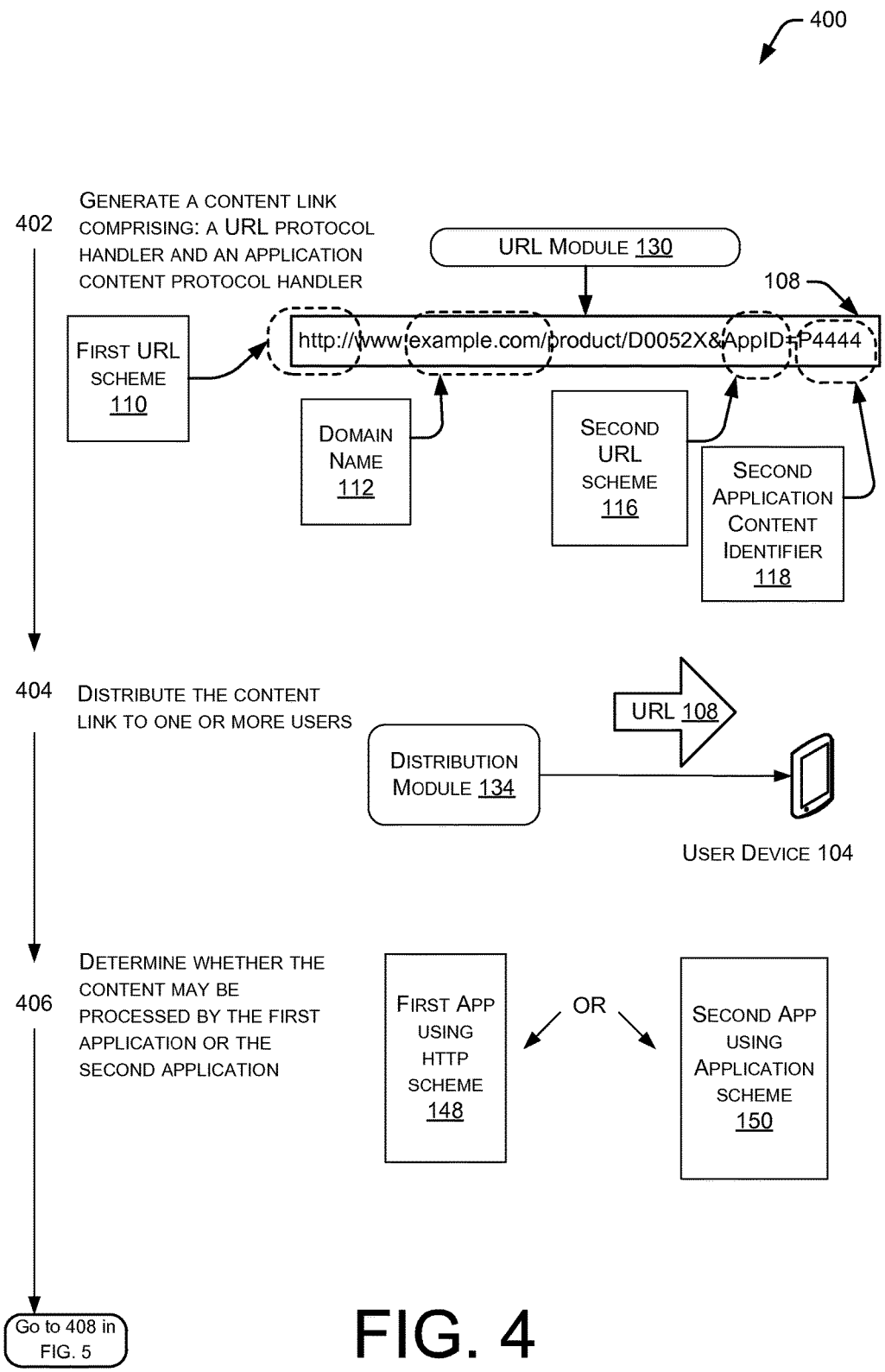
FIGS. 4 and 5 illustrate a flow diagram for using a modified uniform resource locator to provide content to a second application on a user device in accordance with one or more embodiments of the disclosure.
Figure 5:
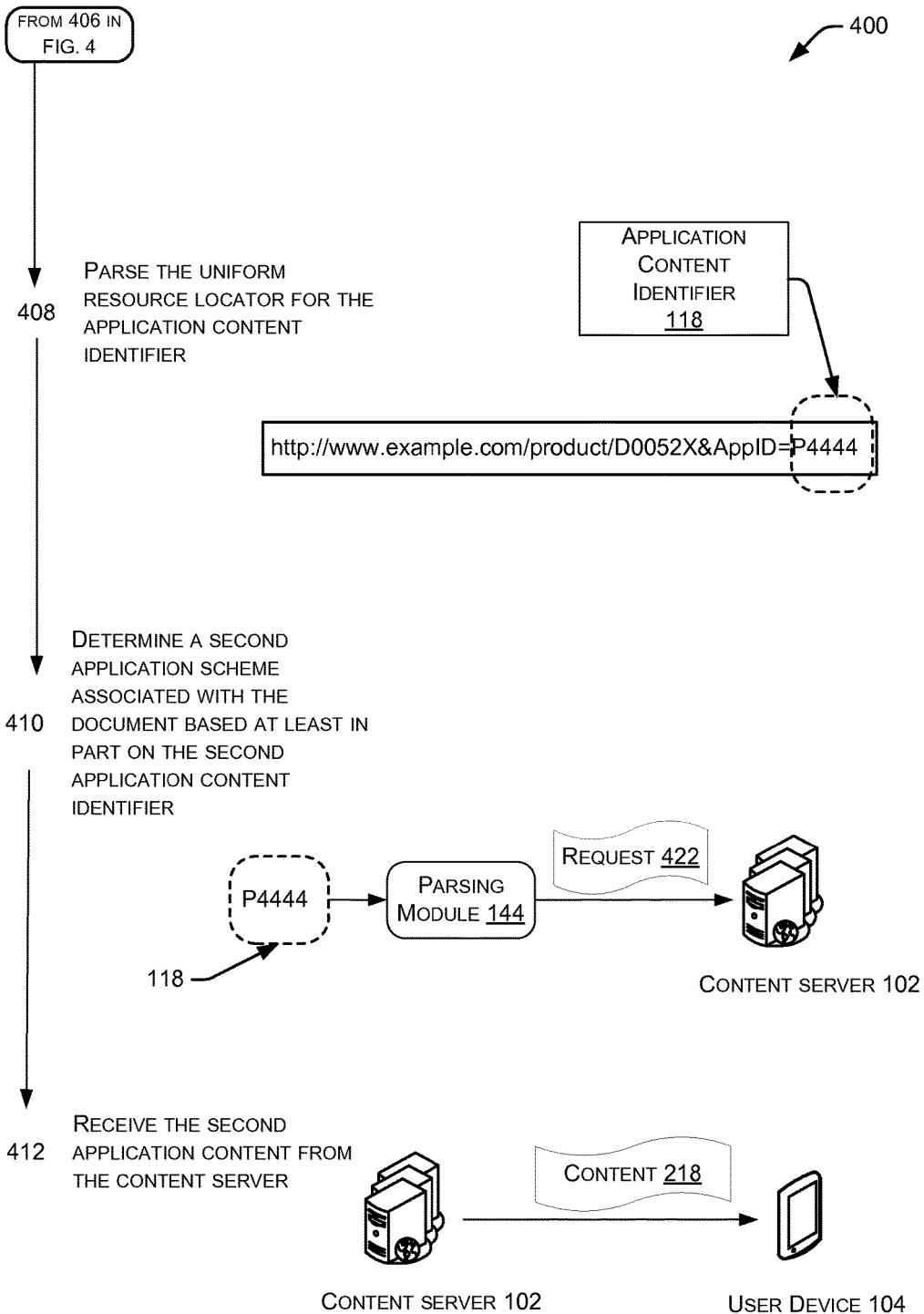

In one embodiment, the uniform resource locator 108 may include a first application scheme 110, a domain name 112, a first app content identifier 114, a second application scheme 116, and a second application content identifier 118. Broadly, the uniform resource locator 108 may be used to retrieve content for the first application or the second application. For example, the first app content identifier 114 may be used to retrieve the content for the first application and the second application content identifier 118 may be used to retrieve the content for the second application. FIGS. 4 and 5 will describe in greater detail how the uniform resource locator 108 may be used by the user device 104 to retrieve content stored in different formats.

FIG. 1 includes an illustration of how the system 100 may be configured to deliver content for the first application and content for the second application using the uniform resource locator 108. While a single content server 102 and single user device 104 are shown, it is understood that any number of these devices may be present in the system 100.

The content server 102, which may include one or more processors 120, a memory 122, and one or more interfaces 124 to communicate with the user device 104 and a network administrator (not shown).

The computer processors 120 may comprise one or more cores and are configured to access and execute (at least in part) computer-readable instructions stored in the one or more memories 122. The one or more computer processors 120 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The content server 102 may also include a chipset (not shown) for controlling communications between the one or more processors 120 and one or more of the other components of the content server 102. In certain embodiments, the content server 102 may be based on an Intel® architecture or an ARM® architecture and the processor(s) 120 and chipset may be from a family of Intel® processors and chipsets. The one or more processors 120 may also include one or more application-specific integrated circuits (ASICs) or application-specific standard products (ASSPs) for handling specific data processing functions or tasks.

The interfaces 124 may also comprise one or more communication interfaces or network interface devices to provide for the transfer of data between the content server 102 and another device directly such as in a peer-to-peer fashion, via a network 106. The communication interfaces may include, but are not limited to: personal area networks ("PANs"), wired local area networks ("LANs"), wireless local area networks ("WLANs"), wireless wide area networks ("WWANs"), and so forth. In FIG. 1, the content server 102 is coupled to the network 106 via a wired connection. However, the wireless system interfaces may include the hardware and software to broadcast and receive messages either using the Wi-Fi Direct Standard (See; Wi-Fi Direct specification published in October 2010) and or the IEEE 802.11 wireless standard (See; IEEE 802.11-2007, published Mar. 8, 2007; IEEE 802.11n-2009, published October 2009) or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical or other signals to exchange data between the content server 102 and another device such as an access point, a host computer, a server, a router, a reader device, another content server 102, and the like. The network 106 may include, but is not limited to, the Internet, a private network, a virtual private network, a wireless wide area network, a local area network, a metropolitan area network, a telephone network, and so forth.

The one or more memories 122 comprise one or more computer-readable storage media ("CRSM"). In some embodiments, the one or more memories 122 may include non-transitory media such as random access memory ("RAM"), flash RAM, magnetic media, optical media, solid state media, and so forth. The one or more memories 122 may be volatile (in that information is retained while providing power) or non-volatile (in that information is retained without providing power.) Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 122 may store an operating system 126 that includes a plurality of computer-executable instructions that may be implemented by the processor 120 to perform a variety of tasks to operate the interface(s) 124 and any other hardware installed on the content server 102. The memory 122 may also include a content module 128, a uniform resource locator (URL) module 130, an app module 132, and a distribution module 134.

The content module 128 may store, manage, and/or organize any or all content that may be generated or distributed by a content provider. The content may include any form of content that may be sent or received over the network 106 or any other type of communications network. The content may include, but is not limited to, news, information, textual content, audio content, or video content. The content may enable, but is not limited to, gaming, retail or commercial transactions, social networking, electronic communication between users, and/or advertising. The content may be stored within the memory 122 or may be stored remotely at a datastore (not shown) or an additional content server (not shown) and may be accessed via the network 106. The content may also include several versions of the same or similar content in one or more formats. For example, one version of content may exist in one or more formats that are compatible with a corresponding viewing application (e.g., first application or second application) that may use a designated instruction language to configure the content for viewing. For the first application, the content may be associated with one or more hypertext markup languages (e.g., HTML5 and XML standards as managed by the World Wide Web Consortium, a WML standard as managed by the Open Alliance) or one or more operating system languages (e.g., Linux/GNU®, UNIX®, Mac OS®, iOS®, Android®, Windows Phone7®, Windows8®).

Generally, the hypertext markup languages are intended to be executed by the first application and the operating systems are intended to execute instructions directly on the hardware components (e.g., a processor) of a user device 104. Although the first application may execute instructions within the context of the user device 104, the instructions are typically executed by a virtual machine or emulator instead of directly interfacing with the processor 136. The virtual machine may comprise a guest operating system within the operating system 142 of the user device 104. The guest operating system is generally a software implementation that provides the functionality of the operating system 142 but may execute instructions without directly accessing the user device's 104 processor 136. This may be done to execute instructions that are not consistent or compatible with the language associated with the user device's 104 operating system 142 or processor 136. A virtual machine may be implemented to operate instructions using a different language that would not otherwise be executable on the user device 104. In one embodiment, the hypertext markup language content provided by the content server 102 may not be compatible with the operating system language being used by the user device 104. Hence, the first application may establish a virtual machine in order to execute the hypertext markup language instructions within the user device 104. Generally, a virtual machine may enable different operating systems to function on a single device. However, the virtual machine may have lower processing capability than the processing capability of the hardware processor 136 on the user device 104.

The URL module 130 may generate uniform resource locators 108 that include an address or identifier associated with one or more pieces of content stored in the content module 128. At high level, a uniform resource locator 108 is an instruction or character string that references the location of a piece of content within a network. Several components may be incorporated together to form the uniform resource locator 108. In one embodiment, the uniform resource locator 108 may include a scheme, a server name, a domain name, and/or a path to the resource to be viewed. The aforementioned elements are merely an example of a uniform resource locator 108 and may not reflect all the elements or features that may be incorporated into the instruction string; as such some elements may be omitted or rearranged in a different order.

The scheme (e.g., first application scheme 110) may define the purpose of the uniform resource locator instruction string. The scheme may indicate which application should be used to view the content or execute the content found at a specified location. For example, the first application may be called using a scheme that may include the characters "http://" or https://." The difference between the two being an "s" indicating that the Internet browsing application may initiate the session using one or more security protocols. Schemes may also exist for additional applications that may be accessed by the browser device. This may include, but is not limited to, file transfer applications (e.g., ftp:), news (e.g., news:), and/or interactive telnet sessions (e.g., telnet:).

The server name may reference a specific server or type of server that may be associated with the location of the content. For example, this may include, but is not limited to, Internet servers (e.g., www) or email servers (e.g., smtp). In some instances, the server name may be omitted since it may not be required to identify a specific server or type of server.

The domain name 112 may be governed under the Domain Naming System that assigns names to entities that intend to be connected to the Internet. The Domain Name Service may use the domain name to resolve queries for the domain name 112 into an Internet Protocol address that may be used to locate a computer anywhere in the world that may be connected to the Internet. The domain name 112 may contain one or more parts referred to as labels that are separated by periods. The top level domain or labels is generally on the right side and the hierarchy descends from right to left. In one embodiment, the domain name 112 may be example.com. The .com being the top domain followed by the lower domain, example. Generally, example would be the name of the entity organization. Additional top level domains may include, but are not limited to, .mil, .gov, .org, .edu, and .biz. Domain names may be governed by the Internet Engineering Task Force via their Request for Comments memorandum (See, RFC 1035, November 1987 and dependent RFC as found on www.ietf.org on Sep. 4, 2012).

The path element of the uniform resource locator may designate the content location within the domain 112. In one embodiment, a product description may be located using the path/product/D0052X. The path may lead to a location in the content module 128 where content may be stored. The path element may also be considered as a type of identifier that may be associated with the content. For example, when the content module 128 receives the identifier the content server 102 may be able to determine which non-hypertext markup language content may be a suitable substitute for the hypertext markup language content associated with the identifier. This concept will be discussed in greater detail below in the description of FIGS. 2 and 3.

The app module 132 may assign second application identifiers (e.g., second application content identifier 118) to content for the second application stored in the content module 128. In conjunction with the URL module 130 and the content module 128, the app module 132 may correlate content for the second application with content for the first application. In this way, the app module 132 may be able to identify content for the second application that is the same or the closest equivalent to the content of the first application that is referenced or associated with a uniform resource locator 108. In one embodiment, the app module 132 may generate a correlation table between first application content identifiers 114 and second application content identifiers 118 or paths. For example, when the app module 132 receives a first application identifier, a second application identifier may be determined using the correlation table. In this way, the app module 132 may use the second application identifier to designate which content for the second application may be sent to the user device 104. In another embodiment, the app module 132 may search the content module 128 for second application content that is most likely similar to the content associated with a received first application identifier. Once the corresponding second application content is discovered, the content server 102 may send the second application content to the user device 104 that provided first application identifier or the uniform resource locators 108. These app module 132 embodiments are merely examples of how the content server 102 may identify second application content that may be related to first application content referenced in a uniform resource locator 108.

In another embodiment, the first application content identifier may include a unique identifier (e.g., a part number or an assigned identifier) that the app module 132 may use in conjunction with a correlation table to determine the location of the content for the second application. Alternatively, the app module 132 may use the unique identifier to search the content module 128 for the content for the second application that may also be associated with the unique identifier. The unique identifier may be any character or string of characters listed within the uniform resource locator 108. Accordingly, the unique identifier may be the entire path location or just a portion of the path location listed in the uniform resource locator 108. In some embodiments, the unique identifier may not be a part of the path location, rather it may be a character string (e.g., second application content identifier 118) appended to the uniform resource locator 108. After determining which content for the second application is associated with the unique identifier or the entire uniform resource locator 108, the distribution module 134 may send the content for the second application to the user device 104.

The distribution module 134 may play a role in distributing uniform resource locators 108 and content for the second application and content for the first application to the one or more user devices 104. For example, the distribution module 134 may embed the uniform resource locators 108 in network communications (e.g., email), websites, advertising, and/or any other medium that may accept the uniform resource locator 108. For example, the distribution module 134 may send emails that may include the uniform resource locator 108 to the users of the user device 104. In another aspect, the distribution module 134 may be directed by the uniform resource locator module 130 or the app module 132 to send content to the user device 104. Accordingly, the content may be displayed by the user device 104.

As shown in FIG. 1, the uniform resource locator 108 may be sent to the user device 104. As noted above, the user device 104 may use the uniform resource locator 108 to request content from the content server 102. In the case of the user device 104, the content may include content for the first application 148 or the second application 150.

The user device 104 may include smartphones, laptops, desktops, tablet computers, televisions, set-top boxes, game consoles, in-vehicle computer systems, and so forth. The user device 104 may comprise one or more processors 136, one or more memories 138, and one or more interfaces 140. These interfaces 140 may allow for the coupling devices such as keyboards, joysticks, touch sensors, cameras, microphones, speakers, haptic output devices, memories, and so forth to the user device 104. The haptic output device may comprise one or more actuators, signal generators, and so forth. For example, the haptic output device may generate direct electrical stimulation of nerves of the user, actuate a piezoelectric element, actuate a motor, and so forth. The interfaces 140 may also include a wireless or wired communications interface or a network interface device that enable the user device 104 to send and receive communications over the network 106. The wireless communication systems (not shown) may be similar to the wireless system described above.

The one or more processors 136 may individually comprise one or more cores as described above and are configured to access and execute (at least in part) instructions stored in the one or more memories 138. The one or more memories 138 may comprise one or more CRSMs as described above.

The one or more memories 138 may store instructions for execution by the one or more processors 136 which perform certain actions or functions. These instructions may include an operating system 142 configured to manage hardware resources, such as the interfaces 140, and provide various services to applications executing on the one or more processors 136. The operating systems may include, but are not limited to, MacOS®, Windows8®, Linux/GNU®, iOS®, Android®, Windows Phone7® and/or any device operating system. The operating system 142 may also include variations or updates that may include at least a portion of the aforementioned operating systems. The operating system 142 may also support the use of virtual machines or emulators that may enable the user device 104 to operate a guest operating system (not shown) as described above. The guest operating system may enable the processing of instructions that may not be compatible with the host operating system 142. In one embodiment, the applications that use the host operating system 142 may be the second application. Applications that use a virtual machine to execute instructions may be considered the first application. The first application may not directly access the processor 136 to execute instructions. Rather, the first application instructions may be executed by a virtual machine processor that executes the instructions in a software environment with the assistance of the host operating system 142 that may directly interface with the processor 136. In this way, the user device 104 may use a virtual machine to execute instructions which may not be directly executable on the processor 136.

The one or more memories 138 may also store lists, arrays, databases, flat files, and so forth. In some implementations, the memories 138 may be stored in memory external to the content server 102 but accessible via the network 106, such as with a cloud storage service.

The one or more memories 138 may also store a variety of information, applications, and/or modules related to the display of content for the second application or content for the first application. The applications and modules may include, but are not limited to, a parsing module 144, an identifier module 146, a first application 148, a second application 150, and/or additional applications 152 that may receive content from the content server 102.

When a hypertext based uniform resource locator 108 is selected on the user device 104, the parsing module 144 may analyze the uniform resource locator 108 to determine whether a related second application 150 may be stored on the user device 104. When the second application 150 is present, the parsing module 144 may query the user to use the second application 150 instead of the first application 148. In some instances, the parsing module 144 may have already stored a user preference for which application to use in this circumstance. For example, the preference may be determined when the second application 150 was installed. The user may also set a general rule that indicates that second application 150 may be used whenever possible or that a specific second application 150 may always be used or not ever used when the hypertext based uniform resource locator 108 is selected.

The parsing module 144 may determine whether a uniform resource locator 108 may be associated with the second application 150 by analyzing the domain name 112 included in the uniform resource locator 108. As noted above, the domain name 112 indicates which entity or organization may be associated with the uniform resource locator 108. The parsing module 144 may determine which second application 150 may be associated with the domain name. When a second application 150 preference has been indicated, the parsing module 144 may analyze the remaining content of the uniform resource locator 108 to determine the location of the content for the second application 150. When a second application scheme 116 is not present in the uniform resource locator 108, the domain name 112 may determine which portion of the uniform resource locator 108 may be used to help find the content for the second application 150.

In one embodiment, the parsing module 144 may send the uniform resource locator 108 back to the content server and request that the content server determine if content for the second application 150 is associated with the uniform resource locator 108. After making this determination, the content server 102 may provide the content for the second application 150 to the user device 104. Accordingly, the second application 150 may display the content on a display screen of the user device 104. An example related to this embodiment will be described further in the discussion of FIG. 6.

In another embodiment, the identifier module 146 may identify a unique identifier associated with the content for the second application 150. The unique identifier may include a character string that identifies the content in a way that the content server 102 could easily identify either the content for the second application 150 or content for the first application 148. The character string may include the location a portion of the content or it may include a number, letter, or alpha-numeric portion of the uniform resource locator 108. The character string may include, but is not limited to, a part number, a reference number, a name, a time or date, or any other phrase or word that may be used as an identifier. An example related to this embodiment will be described further in the discussion of FIGS. 2 and 3.

In another embodiment, the uniform resource locator 108 may include a first application scheme (e.g., first application scheme 110) and a second application scheme 116. The scheme may be associated with a path for the content for the second application 150. A second application scheme 116 may be associated with a path or unique identifier associated with content for the second application 150. Accordingly, the parsing module 144 may be able to request either type of content once the application preference has been determined. An example related to this embodiment will be described further in the discussion of FIGS. 4 and 5.

The second application 150 may include any application that executes instructions directly using the operating system 142. The second application 150 may be written in the same or common language as the operating system 142. These may include, but are not limited to, MacOS®, Windows8®, Linux/GNU®, iOS®, Android®, Windows Phone7®, or any other operating system. In one embodiment, the second application 150 may not use a virtual machine to execute instructions; this is in contrast to the first application that may use a virtual machine as described above. The second application 150 may receive content from the content server 102. Generally, the content may be requested when the user (not shown) interacts with the second application in some way. However, content requests may also involve hypertext links included in the uniform resource locator 108. In one embodiment, the uniform resource locator 108 may include a direct link to content for the second application. When the link is selected, the second application 150 may be spawned to retrieve and display the content for the second application 150. However, in certain embodiments, the uniform resource locator 108 may include character strings that may not include a reference to the content for the second application or may include a combination reference to content of the first application 148 and content for the second application 150 in the same instruction string. Accordingly, the operating system 142 and the identifier module 146 may be configured to obtain content for the second application 150 when a direct link to the content for the second application 150 is not readily available. The content for the second application 150 may then be displayed.

The second application 150 may display the content as well as other features that may be important to the user experience. In one embodiment, the content for the second application 150 may be related to a product being sold by an online retailer. In this instance, the content for the second application 150 may include a page banner, app product information content, app contact information, app advertising information, and an app search feature flanked by two browsing arrows that allow the user to move forward and backward between different pages of the second application 150. The second application 150 may be implemented using a touch screen. Additionally, the features may also be selected using a pointer or scroll features that may be controlled by one or more interface 140 elements (not shown).

The page banner may include any information that may typically be shown on each page of the content for the second application 150. In this embodiment, the name of the entity or organization is shown (e.g., example.com). However, the page banner may include other information related to the entity or any other content that may be displayed by the second application 150 interface. In some instances, the page banner may be shown on every page or on select pages of the content for the second application 150.

In another embodiment, the user device 104 may be configured to not use or unable to use the second application 150. When the uniform resource locator 108 is selected, the user device 104 may initiate the first application 148 to display the content. In this instance, the first application 148 may include an Internet browsing application configured to execute hypertext markup language instructions using a virtual machine running in memory 138 on the user device 104.

The first application 148 may be configured to present one or more browser interfaces which may include a search bar, a forward button, a back button, a home button, a reload, and a stop loading button. The first application 148 may display a variety of content provided by the content server 102. The content may include images, video, and/or text related to an online merchant. For example, the content may include product information related to goods or services being offered by the online merchant. The content may also include search features, purchasing transaction features, and/or any other features related to the sales, advertising, and purchasing of goods or services from the online merchant. In one embodiment, the content may be interspersed with advertising related to the host of the content or to other merchants who have requested to place their ads within the hosted content. The ads may include images, text, audio, or video to influence a consumer to perform a desired task or action. For example, the consumer may select the content to find additional information related to the product or may be prompted to provide contact information to receive additional information from the advertiser.

The first application 148 may be a corresponding counterpart to the second application 150. In that the content for both of them may be derived from the same uniform resource locator 108 and that may result in the display of the same or related content on the user device 104. For example, the first application 148 may include a title portion that may identify the entity or organization (e.g., example.com) associated with the content. A product information section may include information related to a product being sold by the entity. Lastly, the first application 148 may include a contact information feature and an advertising element. Each of the aforementioned features of the first application 148 may be the same or similar as the corresponding features, in terms of content, that is displayed on the second application 150. It should be noted that the features are likely to appear differently or organized in a different matter or they may be consistent to the degree possible given the limitation or capabilities of the devices and the applications (e.g., first application 148, second application 150).

Figure 2:
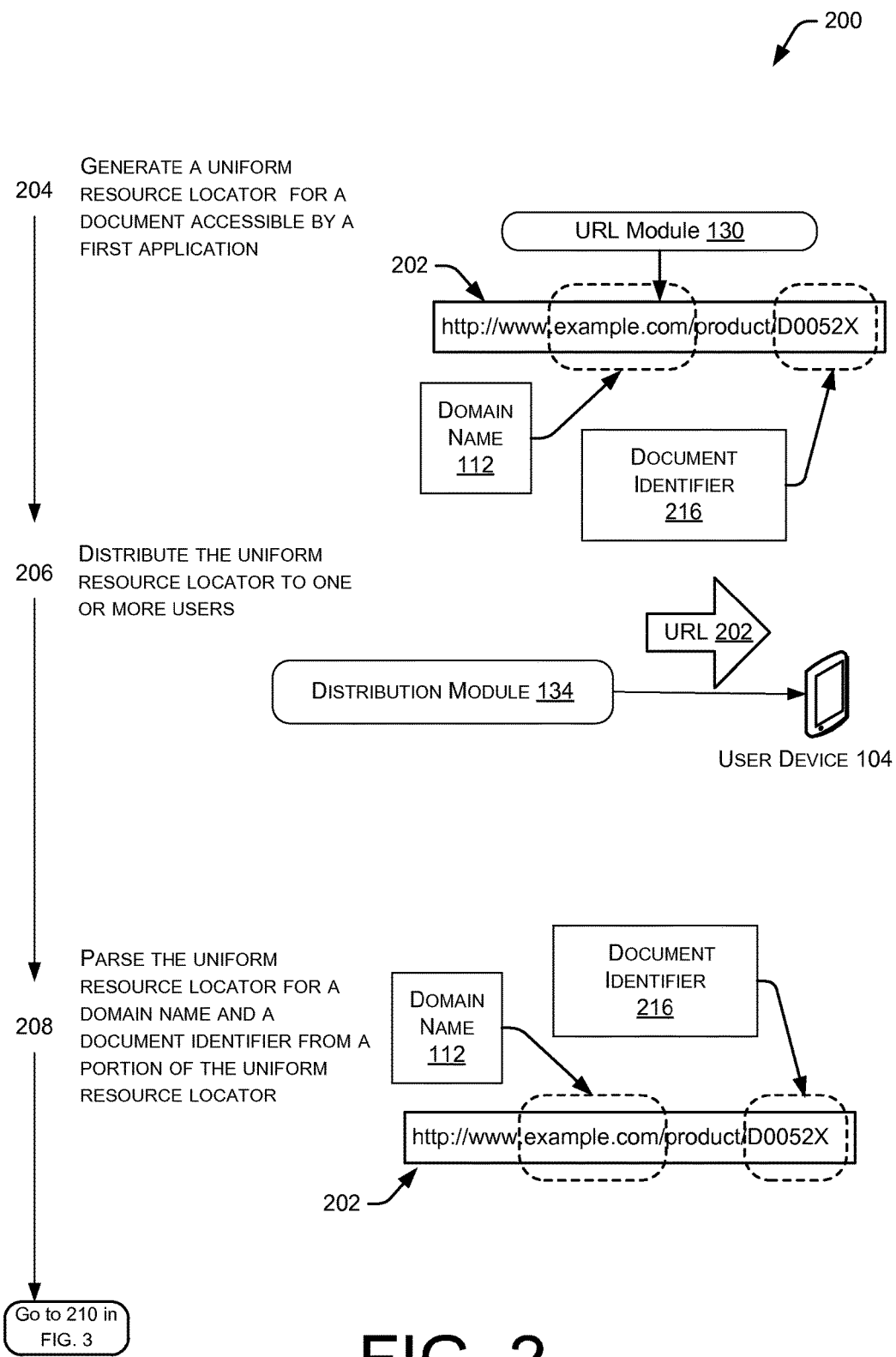
FIGS. 2 and 3 illustrate a flow diagram for using an unmodified uniform resource locator to provide content to a second application on a user device in accordance with one or more embodiments of the disclosure.
Figure 3:
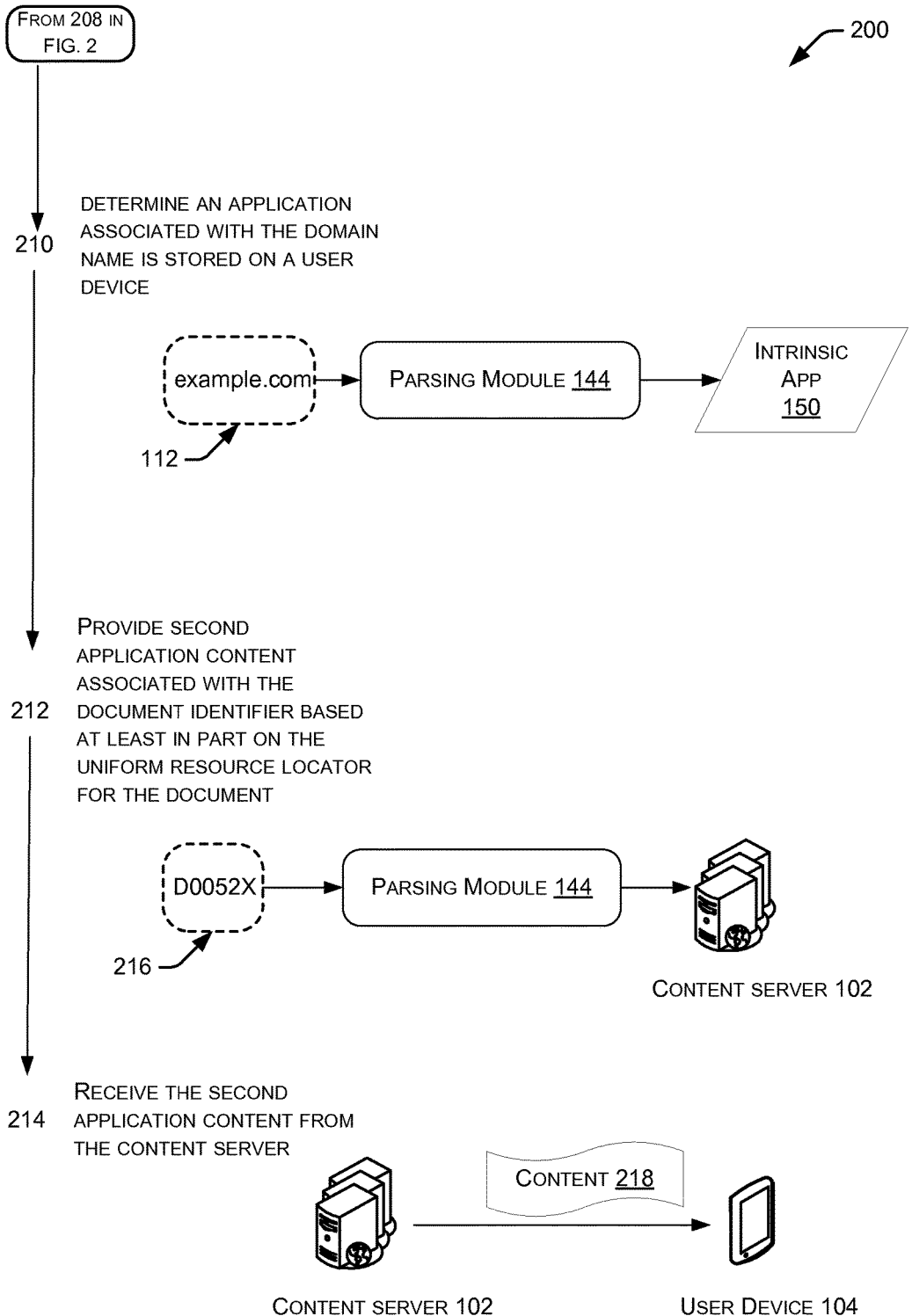

FIGS. 2 and 3 illustrate a flow diagram 200 for using an unmodified uniform resource locator 202 to provide content to a second application 150 on a user device 104. In this embodiment, the user device 104 may receive a uniform resource locator 202 that is configured to enable access to hypertext markup language content and may not include any second application content identifiers 118. The uniform resource locator 202 may be considered unmodified from the intended use of displaying content for the first application 148. The flow diagram 200 illustrates one embodiment on how content for the second application 150 may be retrieved using an unmodified uniform resource locator 202. It should be noted that in other embodiments the sequencing of the flow diagram 200 may be altered and some steps may be omitted.

At block 204, the URL module 130 of the content server 102, may generate a uniform resource locator 202 that may be associated with content for the first application 148. In this embodiment, the uniform resource locator 202 may include a domain name 112 and a document identifier 216. As noted above in the discussion of FIG. 1, the domain name 112 may be representative of the entity or organization that may be responsible for the content displayed by the first application 148. The first application 148 content may be associated with the document identifier 216. For example, product content may be linked with this document identifier 216 and any other content for the second application 150 related to the product may also be associated with this identifier. In one embodiment, the domain name 112 is example.com and the document identifier 216 is D0052X.

At block 206, the distribution module 134 would receive the uniform resource locator 202 and transmit it to the user device 104 over the network 106. In one embodiment, this may include sending an email with the uniform resource locator embedded in the email. In another embodiment, the distribution module 134 may embed the uniform resource locator in a web page (not shown) or any other content that the user device 104 may be able to display. Accordingly, the user device 104 may encounter or receive the uniform resource locator 202 in a variety of different ways when navigating the network 106.

At block 208, when the user device 104 encounters the uniform resource locator 202, the parsing module 144 may parse the uniform resource locator 202 to extract the domain name 112 and the document identifier 216. The parsing module 144 may be given instructions on how to parse the uniform resource locator 202 when a certain domain name 112 appears. In another embodiment, the parsing module 144 may select the entire uniform resource locator 202 as the document identifier 216 or at least a portion of the uniform resource locator 202 that may exclude the domain name 112 and the scheme to left of the domain name 112. For example, the document identifier 216 may be D0052X or/product/D0052X.

At block 210, the parsing module 144 may determine when the user device 104 may include a second application 150 or may be configured to receive content for the second application 150. This determination may include referencing the domain name 112 and comparing to the second application 150 stored on the user device 104. The user device 104 may prompt the user on whether to use the first application 148 or the second application 150 to view content from the domain name 112. The user device 104 may also implement user provided guidelines on which application to use to view content from a domain name 112. In this way, the user device 104 may elect to use the second application 150 to view the content instead of the first application 148.

At block 212, the user has elected to use the second application 150 to view the content associated with the uniform resource locator 202. The parsing module 144 may send a request to the content server 102 for the content for the second application 150. The request may include the document identifier 216.

At block 214, the user device 104 may receive a response to the request provided to the content server 102. The response may include the second application content 218. The received content may be compatible with the second application 150 and may be displayed on a display screen of the user device 104.

FIGS. 4 and 5 illustrate a flow diagram 400 for using a modified uniform resource locator 108 to provide content to the second application 150 on a user device 104. In this embodiment, the user device 104 may receive a uniform resource locator 108 that is configured to enable access to content for the first application and content for the second application 150. The flow diagram 400 illustrates one embodiment on how content for the second application 150 may be retrieved using the modified uniform resource locator 108. It should be noted that in other embodiments the sequencing of the flow diagram 400 may be altered and some steps may be omitted.

At block 402, the URL module 130 of the content server 102, may generate a uniform resource locator 108 that may be enabled to direct the user device 104 to first application 148 or the second application 150. In this embodiment, the uniform resource locator 108 may include a first application scheme 110, a domain name 112, a second application scheme 116, and a second application content identifier 118. As noted above in the discussion of FIG. 1, the domain name 112 may be representative of the entity or organization that may be responsible for the content. In this instance, first application scheme 110, as noted above in the FIG. 1 description, may indicate that the uniform resource locator 108 includes a reference to content that needs hypertext markup language application to be viewed. This embodiment also includes a second application scheme 116 that may include the text "AppID." In other embodiments, the second application scheme 116 may include any type string that may recognizable or designated as the application scheme. A second application content identifier 118 (e.g., P4444) may be adjacent to the second application scheme 116. It should be noted this arrangement is intended as an example and that both second application scheme 116 and second application content identifier 118 may be arranged and configured in many different ways. However, the second application scheme 116 may act as flag to indicate that application content is available and the application content identifier may provide a way to retrieve or locate that application content. In this embodiment, the application content and the hypertext content reference in the uniform resource locator 108 may be similar to each other or may be considered equivalents of each other.

At block 404, the distribution module 134 would receive the uniform resource locator 108 and transmit it to the user device 104 over the network 106. In one embodiment, this may include sending an email with the uniform resource locator 108 embedded in the email. In another embodiment, the distribution module 134 may embed the uniform resource locator 108 in a web page (not shown) or any other content that the user device 104 may be able to display. Accordingly, the user device 104 may encounter or receive the uniform resource locator 108 in a variety of different ways when navigating the network 106.

At block 406, when the user device 104 encounters the uniform resource locator 108, the parsing module 144 may parse the uniform resource locator 108 to extract the first application scheme 110, a domain name 112, a second application scheme 116, and a second application content identifier 118. When the parsing module 144 determines that two different types of content may be available based at least in part on the first application scheme 110 and the second application scheme 116. Then a decision on which content to use may need to be determined.

At block 408, the parsing module 144 may determine the user device 104 may include the second application 150 that may be configured to receive content for the second application 150. This determination may include comparing the domain name 112 to the second application 150 stored on the user device 104. The user device 104 may prompt the user to select the second application 150 or the first application 148 to view the content. Alternatively, the user device 104 may implement user preference guidelines and may select the second application 150 or the first application 148 automatically.

At block 410, the user has elected to use the second application 150 to view the content associated with the uniform resource locator 108. The parsing module 144 may send a request 422 to the content server 102 for the content for the second application 150. The request may include the application content identifier 118.

At block 412, the user device 104 may receive a response to the request provided to the content server 102. The response may include the second application content 218. The received content may be compatible with the second application 150 and may be displayed on a display screen of the user device 104.

Figure 6:
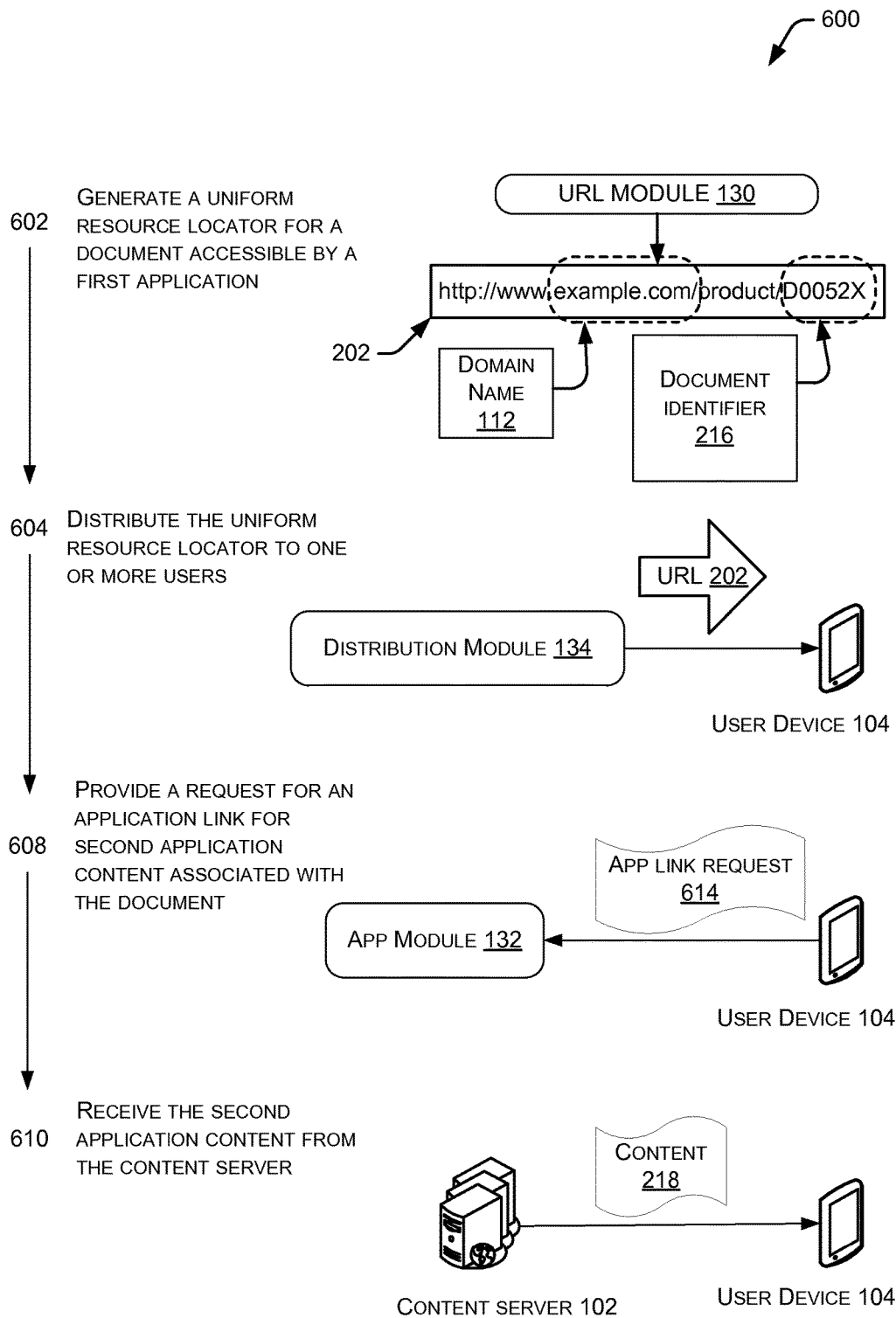
FIG. 6 illustrates a flow diagram for using an unmodified uniform resource locator to provide content to a second application on a user device in accordance with one or more embodiments of the disclosure.

FIG. 6 illustrates a flow diagram 600 for using an unmodified uniform resource locator 202 to provide content to the second application 150 on a user device 104. In this embodiment, the user device 104 may receive a uniform resource locator 202 that is configured for displaying hypertext markup language content and may not include any second application specific identifiers. The uniform resource locator 202 may be considered unmodified from the intended use of displaying content for the first application 148. The flow diagram 600 illustrates one embodiment on how content for the second application 150 may be retrieved using an unmodified uniform resource locator 202. It should be noted that in other embodiments the sequencing of the flow diagram 600 may be altered and some steps may be omitted.

At block 602, the URL module 130 of the content server 102, may generate a uniform resource locator 202 that may be associated with a first application 148. In this embodiment, the uniform resource locator 202 may include a domain name 112 and a document identifier 216. As noted above in the discussion of FIG. 1, the domain name 112 may be representative of the entity or organization that may be responsible for the content displayed in the first application 148. In this instance, the entity would be example.com that is attempting sell a product listed in the product information section of the first application 148 content. The first application 148 content may be associated with the document identifier 216. The product may be linked with this document identifier 216 and any other content for the second application 150 related to the product may also be associated with this identifier.

At block 604, the distribution module 134 may receive the uniform resource locator 202 and transmit it to the user device 104 over the network 106. In one embodiment, this may include sending an email with the uniform resource locator 202 embedded in the email. In another embodiment, the distribution module 134 may embed the uniform resource locator 202 in a web page (not shown) or any other content that the user device 104 may be able to display. Accordingly, the user device 104 may encounter or receive the uniform resource locator 202 in a variety of different ways when navigating the network 106.

At block 608, the parsing module 144 may determine when the user device 104 may include a second application 150 may be configured to receive content for the second application 150. This determination may include referencing the domain name 112 and comparing to the second application 150 stored on the user device 104. In this way, the user device 104 may elect to use the second application 150 to view the content instead of the first application 148. In this embodiment, the parsing module 144 may not parse the uniform resource locator 202. In this case, the parsing module 144 may elect to send the entire uniform resource locator 202 back to the content server. The parsing module 144 may send a request to the content server 102 for the content of the second application 150. The content server 102 will determine which content for the second application 150 is associated with the hypertext based uniform resource locator 202. The content server 102 determines which content for the second application 150 to send instead of using first application content identifier 114 that may not have been provided by the parsing module 144. In this instance, the application link request 614 to application module 132 may include the entire uniform resource locator 202.

At block 610, the user device 104 may receive a response to the request provided to the content server 102. The response may include the content 218 for the second application 150. The received content may be compatible with the second application 150 and may be displayed on a display screen of the user device 104.

Figure 7:
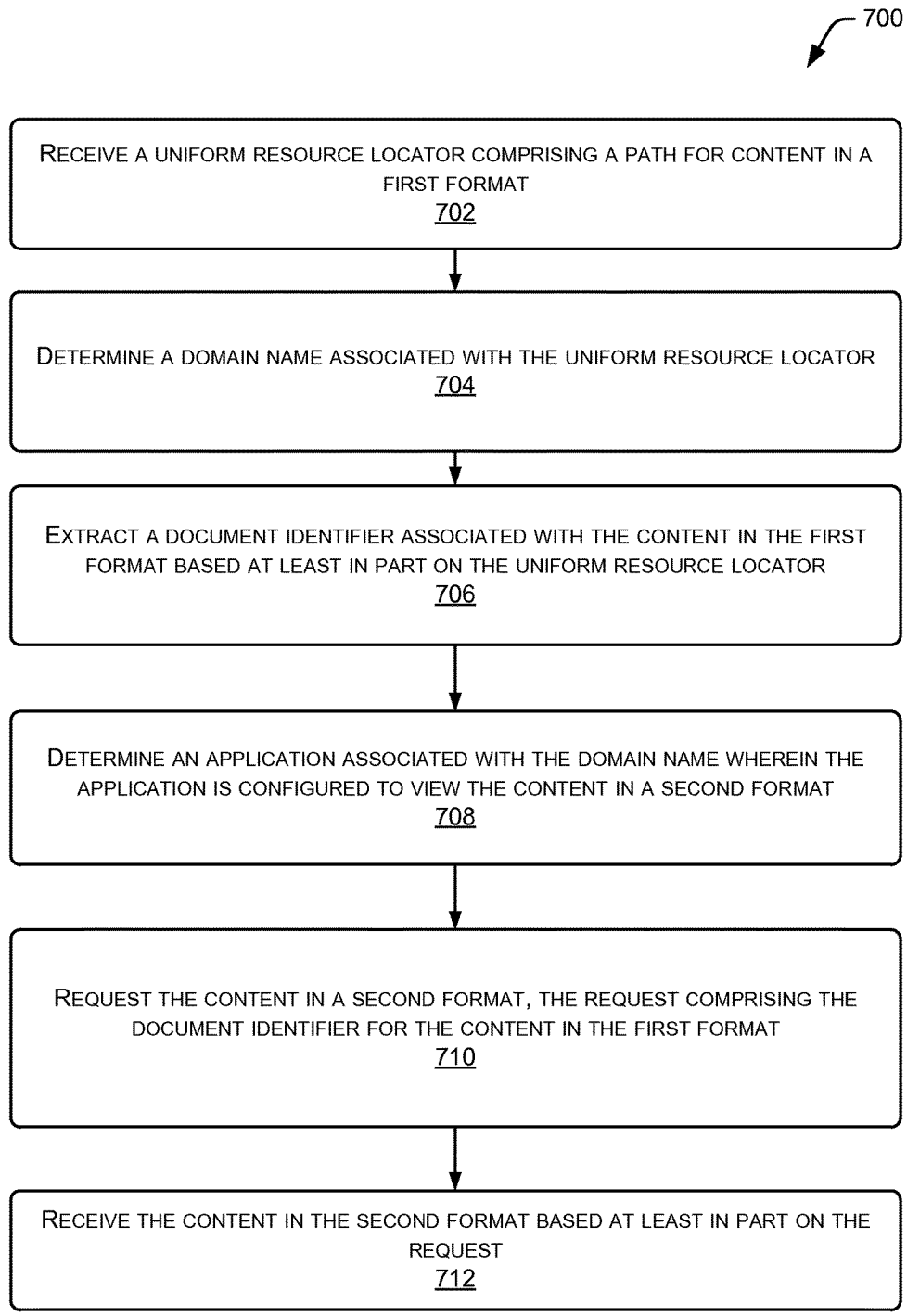
FIG. 7 illustrates a flow diagram for a method for obtaining content for the second application using an unmodified uniform resource locator in accordance with one or more embodiments of the disclosure.

FIG. 7 illustrates a flow diagram for a method 700 to obtain content for the second application 150 at the user device 104 from the content server 102 using an unmodified uniform resource locator 202. Method 700 describes the transfer of content for the second application 150 from the point of view of the user device 104. In this embodiment, the user device 104 may receive a uniform resource locator 202 that is configured to enable access to hypertext markup language content. For example, the uniform resource locator 202 may include a first application scheme (e.g., http:) a path to hypertext markup language content (e.g., www.example.com/product/D0052X). Method 700 illustrates one embodiment of how content for the second application 150 may be retrieved using the unmodified uniform resource locator 202. It should be noted that in other embodiments the sequencing of the method 700 may be altered and some steps may be omitted.

At block 702, the user device 104 may receive a uniform resource locator 202 comprising an address for content in a hypertext markup language format from the content server 102. In one embodiment, the uniform resource locator 202 may also include the first application scheme 110 that may designate that the content may be displayed using a first application 148. In this embodiment, the hypertext markup language format may not be compatible with the first application 148 or the second application 150 on the user device 104. Accordingly, the user device 104 may determine to locate content that may be compatible with the second application 150. The content may include an electronic document that may include selectable objects that provide links to other electronic documents or additional information that may be embedded within the electronic document. The selectable objects may be selected by placing a cursor over the selectable object and pressing a mouse or keyboard button to initiate an action. In a touch screen embodiment, a user may use their finger to select the selectable objects. In one specific embodiment, the content may comprise an electronic document that includes embedded hypertext links that may direct an internet browser to additional content when the links are selected by a user.

As noted above, the second application 150 may interact directly with the operating system 142 and the processor 136 on the user device 104. Generally, the second application 150 may use a computer instruction language that is the same as or is compatible with the operating system 142. In contrast, the first application 148 may use a computer instruction language that is not directly compatible with the operating system 142 language. As described above in the description of FIG. 1, the first application 148 may use a virtual machine to process the non-compatible instructions. In this way, the first application 148 may not directly process their instructions using the processor 136.

At block 704, the user device 104 may determine a domain name 112 associated with the uniform resource locator 202 and determine a document identifier 216 associated with the content in the hypertext based at least in part on the uniform resource locator 202. The domain name 112 may determine the source of the hypertext content. In this embodiment, the domain name 112 may also indicate the source of the content for the second application 150. The document identifier 216 may identify the hypertext content in a way that the user device 104 or content server 102 may be able to distinguish between several hypertext documents stored on the content server 102. In one embodiment, the document identifier 216 may be the path or location of the hypertext document. In this embodiment, the path may include the entire address or a portion of the entire address. In another embodiment, the document identifier 216 may be a unique identifier that is associated with the hypertext document.

At block 706, the user device may extract a document identifier 216 from the uniform resource locator 202 that is associated with the content in a first format. The first format may be associated with content formatted for the first application 148. In one embodiment, the document identifier 216 may be the entire address associated with the uniform resource locator 202 or it may include a portion of the uniform resource locator 202 as shown in FIGS. 2 and 6.

At block 708, the user device 104 may determine the second application 150 associated with the domain name 112 stored in memory 138. The user device 104 may associated the domain name 112 with the second application 150 when the second application 150 was installed on the user device 104. Alternatively, the user device 104 may search and attempt to correlate the second application 150 with the domain name 112.

At block 710, the user device 104 may provide a request for the content in the second application 150 format from the content server 102. The request may include the document identifier 216 associated with the content in the first application 148 format. In one embodiment, the content server 102 may correlate the document identifier 216 with the content for the second application 150. This may be done using a correlation table or any other translation technique. In another embodiment, the document identifier 216 may also be associated with or may identify the content for the second application 150 in addition to the content for the first application 148. In this way, the content server 102 may identify the content for the second application 150 directly from the document identifier 216. For example, when the content server 102 receives a request for content for the second application 150 that includes the identifier, the content server 102 may directly access the content for the second application 150 and provide it to the user device 104.

At block 712, the user device 104 may receive at least the portion of the content in the second application 150 format based at least in part on the request. Accordingly, the user device 104 may display the content for the second application 150.

Figure 8:
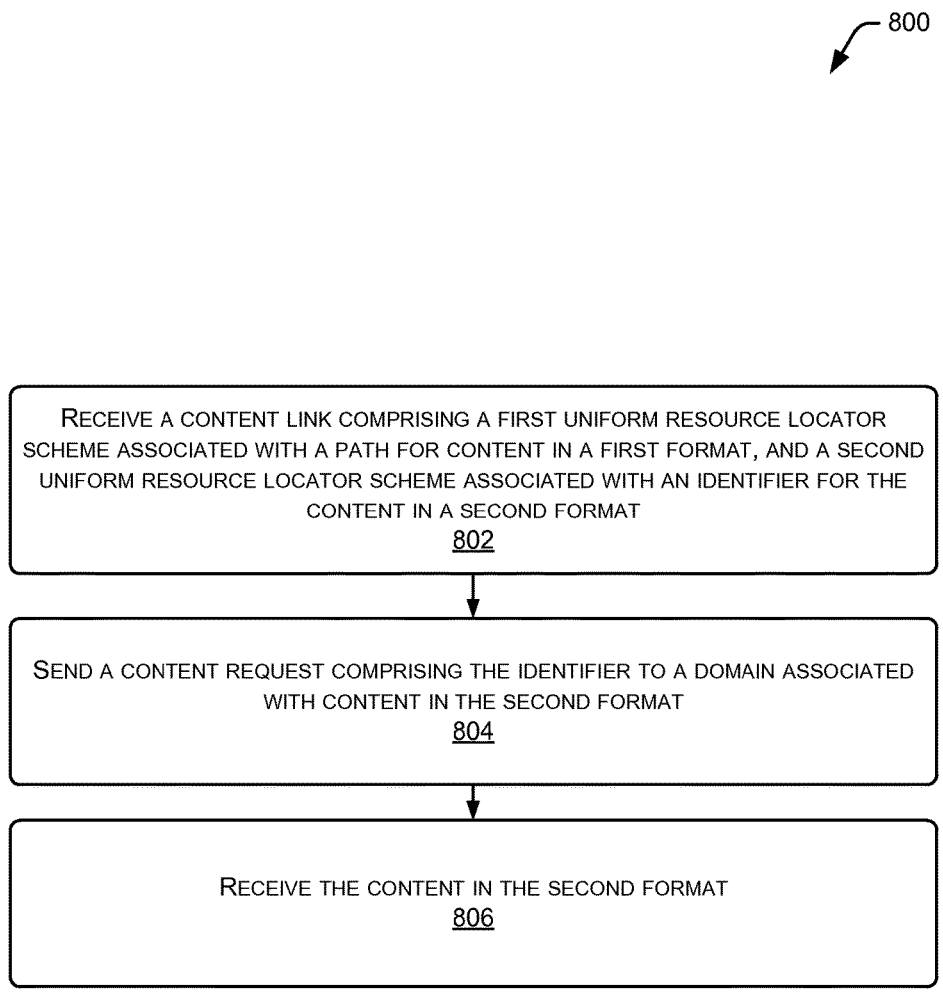
FIG. 8 illustrates a flow diagram for a method for obtaining content for the second application using a modified uniform resource locator in accordance with one or more embodiments of the disclosure.

FIG. 8 illustrates a flow diagram for a method 800 for obtaining content for the second application 150 at the user device 104 using a modified uniform resource locator 108 provided by the content server 102. Method 800 describes the transfer of content for the second application 150 from the point of view of the user device 104. In this embodiment, the user device 104 may receive a uniform resource locator 108 that is configured to enable access to the first application 148 content or to content for the second application 150. For example, the uniform resource locator 108 may include a first application scheme 110 followed by a path to hypertext markup language content (e.g., www.example.com/product/D0052X). In this embodiment, the uniform resource locator 108 may also include a second application content scheme 116 that is appended to the end of the hypertext portion of the uniform resource locator 108. A second application content identifier 118 may also be associated with the second application scheme 116. Method 800 illustrates one embodiment of how content for the second application 150 may be retrieved using the modified uniform resource locator 108. It should be noted that in other embodiments the sequencing of the method 800 may be altered and some steps may be omitted.

At block 802, the user device 104 may receive a content link comprising a uniform resource locator scheme (e.g., first application scheme 110), an address for the content in a first format that is associated with the uniform resource locator scheme, a second application scheme 116, and an identifier (e.g., second application content identifier 118) for the content in a second format that is associated with the second application scheme 116. The content link (e.g., uniform resource locator 108) may enable the user device 104 to retrieve content for the first application 148 or content for the second application 150. The second application scheme 116 and its second application content identifier 118 may be appended to the end of the uniform resource locator 108. This may be done without interfering with the hypertext portion of the uniform resource locator 108. For example, the second application content scheme 116 may be ignored by the first application 148 when the user device 104 elects to view the content of the first application 148 instead of the content for the second application 150. Likewise, the second application 150 may ignore the first application 148 portion of the uniform resource locator 108 when content for the second application 150 is elected to be viewed over the content for the first application 148.

At block 804, the user device 104 may provide a content request 422 comprising the second application content identifier 118 to a domain name 112 associated with the content in the second application 150 format.

At block 806, the user device 104 may receive the content 218 for the second application 150 format based at least in part on the content request 422.

Figure 9:
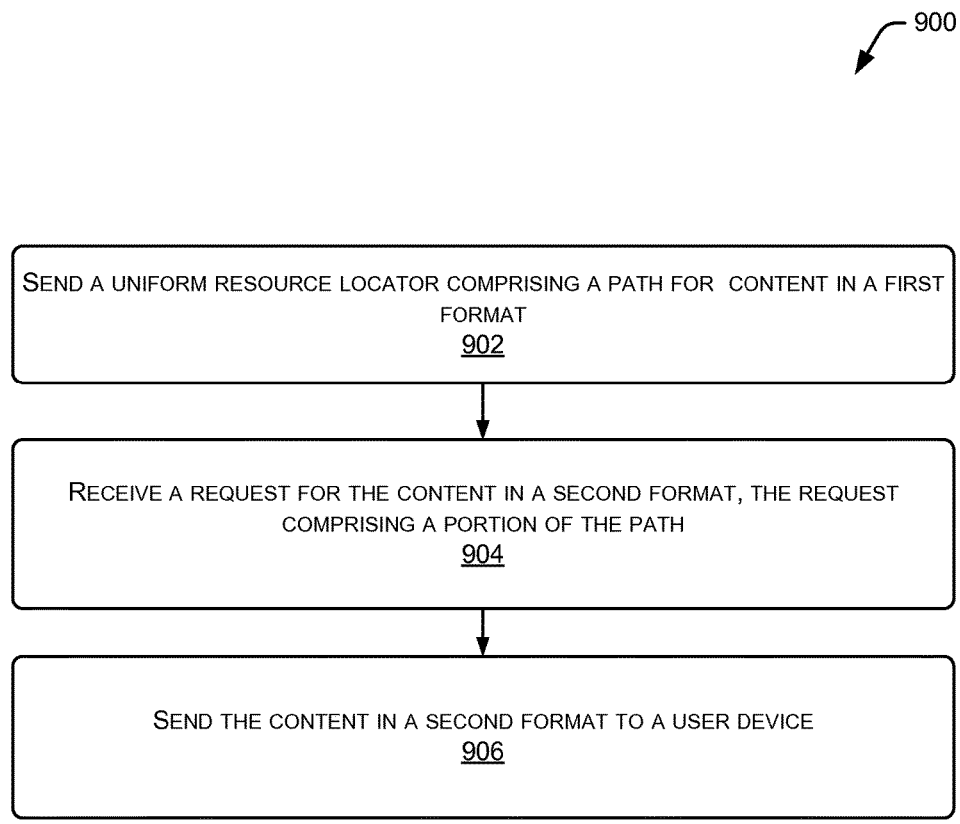
FIG. 9 illustrates a flow diagram for a method for providing content for the second application using an unmodified uniform resource locator in accordance with one or more embodiments of the disclosure.

FIG. 9 illustrates a flow diagram for a method 900 for providing content for the second application 150 using an unmodified uniform resource locator 202 to a user device 104. Method 900 describes the transfer of content for the second application 150 from the point of view of the content server 102. In this embodiment, the content server 102 may generate a uniform resource locator 202 that is configured to enable access to content for the first application 148. For example, the uniform resource locator 202 may include a scheme (e.g., http://) a path to content for the first application 148 (e.g., www.example.com/product/D0052X). Method 900 illustrates one embodiment of how content from the second application 150 may be provided based at least in part using the unmodified uniform resource locator 202. It should be noted that in other embodiments the sequencing of the method 900 may be altered and some steps may be omitted.

At block 902, the content server 102 may provide a uniform resource locator 202 comprising an address for content in a first format. The first format may include, but is not limited to, a hypertext markup language associated with the first application 148.

At block 904, the content server 102 may receive a request for the content in a second format. The second format may include, but is not limited to, computer instructions that are compatible with an operating system 142 of the user device 104 that may have sent the request. As noted above, the compatible computer instructions may be referred to content for the second application 150 as discussed in the description of FIG. 1. As noted above, the content for the second application 150 may be similar to the content for the first application 148 that was associated with resource locator link discussed in block 902. In one embodiment, the request may comprise a portion of the address associated with the locator link described in block 902. In another embodiment, the request may comprise a document identifier 216 that may be used to locate the content for the second application 150 as discussed above in the description of FIGS. 1 &2.

At block 906, the content server 102 may provide the content for the second application 150 based at least in part locating the content using the information provided in the request described in block 904.

FIG. 10 illustrates a flow diagram of a method 1000 for providing content for the second application 150 using a modified uniform resource locator 108 generated by the content server 102 and provided to the user device 104. Method 1000 describes the transfer of content for the second application 150 from the point of view of the content server 102. In this embodiment, the content server 102 may generate a uniform resource locator 108 that is configured to enable access to content for the first application 148 or to content for the second application 150. For example, the uniform resource locator 108 may include a first application scheme 110 followed by a path to hypertext markup language content (e.g., www.example.com/product/D0052X). In this embodiment, the uniform resource locator 108 may also include a second application scheme 116 that is appended to the end of the hypertext portion of the uniform resource locator 108. A second application content identifier 118 may also be associated with the second application content scheme 116. Method 1000 illustrates one embodiment of how content for the second application 150 may be retrieved using the modified uniform resource locator 108. It should be noted that in other embodiments the sequencing of the method 1000 may be altered and some steps may be omitted.

At block 1002, the content server 102 may generate a reference to content comprising a first instruction set associated with a first format of the content and a second instruction set associated with a second format of the content. The reference to content may include a uniform resource locator 108 that include a first application scheme 110 and second application content scheme 116. The first instruction set may include the location of content for the first application 148 and the second instruction set may include the location of or an identifier 118 associated with content for the second application 150. The reference may be provided to the user device 104 over the network 106.

At block 1004, the content server 102 may receive a request to provide the content in the second format. The request 422 may include the second application content identifier 118. The content server 102 may access or retrieve the content for the second application 150 associated with the identifier 118. In one embodiment, the content for the second application 150 may the same or similar to the content for the first application 148 referenced in the uniform resource locator 108.

At block 1006, the content server 102 may provide the content in the second format based at least in part on the request 422. In this embodiment, the second application 150 may receive the content for the second application 150 and display the content on the display screen of the user device 104.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A method, comprising:
   receiving, from a content server by one or more processors of a user device, a uniform resource locator (URL) identifier comprising:
   a first application scheme indicating an Internet browser application for viewing a first version of content;
   a first content identifier indicating the first version of the content, the first content identifier comprising a domain name identifying an entity for providing the first version of the content and a path identifying a location where the first version of the content is stored;
   a second application scheme indicating a second application for viewing a second version of the content; and
   a second content identifier indicating the second version of the content;
   causing presentation, by the one or more processors, of a link corresponding to the URL identifier;
   determining, by the one or more processors, a selection of the link;
   parsing, by the one or more processors, the URL identifier to determine the domain name;
   determining, by the one or more processors, a stored preference associated with the domain name and the second application;

determining, by the one or more processors, that the second application is executable by the user device;

sending, to the content server by the one or more processors, a URL request for the second version of the content, wherein the URL request is indicative of the second content identifier; and displaying, by the user device, the second version of the content.

2. The method of claim 1, wherein a first portion of the URL identifier comprises the first application scheme and the first content identifier, wherein a second portion of the URL identifier comprises the second application scheme and the second content identifier, and wherein the URL identifier comprises the second portion appended to an end of the first portion.

3. A method, comprising:

receiving, from a content server, a uniform resource locator (URL) identifier comprising a first content identifier identifying a first version of content to be presented using a first viewing application and a second content identifier identifying a second version of content to be presented using a second viewing application, wherein the first content identifier comprises a domain name identifying an entity for providing the first version of the content;

determining a selection of a link corresponding to the URL identifier;

determining a stored preference associated with the domain name and the second viewing application;

sending, to the content server, a request for the second version of the content to be presented using the second viewing application, wherein the request comprises at least a portion of the first content identifier;

receiving, from the content server, the second version of the content; and causing presentation of the second version of the content using the second viewing application.

4. The method of claim 3, wherein the uniform resource locator (URL) identifier further comprises:

a first application scheme indicating the first viewing application;

the first content identifier identifying the first version of the content;

a second application scheme indicating the second viewing application; and the second content identifier identifying the second version of the content.

5. The method of claim 4, wherein the first viewing application comprises an Internet browser application.

6. The method of claim 4, wherein a first portion of the URL identifier comprises the first application scheme and the first content identifier, wherein a second portion of the URL identifier comprises the second application scheme and the second content identifier, and wherein the URL identifier comprises the second portion appended to an end of the first portion.

7. The method of claim 3, wherein the first content identifier further comprises:

a path identifying a location of the first version of the content.

8. The method of claim 3, further comprising:

parsing the URL identifier to determine the domain name; and determining that the second viewing application is configured to process the second version of the content provided by an entity associated with the domain name.

9. The method of claim 3, wherein the request comprises a URL request.

10. The method of claim 3, further comprising displaying the link corresponding to the URL identifier.

11. A system, comprising:

non-transitory computer readable media storing program instructions; and one or more processors configured to execute the program instructions to cause:

receiving, from a content server, a uniform resource locator (URL) identifier comprising a first content identifier identifying a first version of content to be presented using a first viewing application and a second content identifier identifying a second version of content to be presented using a second viewing application, wherein the first content identifier comprises a domain name identifying an entity for providing the first version of the content;

determining a selection of a link corresponding to the URL identifier;

determining a stored preference associated with the domain name and the second viewing application;

sending, to the content server, a request for the second version of the content to be presented using the second viewing application, wherein the request comprises at least a portion of the first content identifier;

receiving, from the content server, the second version of the content; and causing presentation of the second version of the content using the second viewing application.

12. The system of claim 11, wherein the uniform resource locator (URL) identifier further comprises:

a first application scheme indicating the first viewing application;

the first content identifier identifying the first version of the content;

a second application scheme indicating the second viewing application; and the second content identifier identifying the second version of the content.

13. The system of claim 12, wherein a first portion of the URL identifier comprises the first application scheme and the first content identifier, wherein a second portion of the URL identifier comprises the second application scheme and the second content identifier, and wherein the URL identifier comprises the second portion appended to an end of the first portion.

14. The system of claim 11, wherein the first content identifier further comprises:

a path identifying a location of the first version of the content.

15. The system of claim 11, wherein the one or more processors are further configured to execute the program instructions to cause:

parsing the URL identifier to determine the domain name; and determining that the second viewing application is configured to process the second version of the content provided by an entity associated with the domain name.

16. The method of claim 1, wherein determining the stored preference comprises:

determining that the first application scheme is present on the user device;

determining that the second application scheme is present on the user device; and determining that the stored preference indicates an application preference to use the second application.

17. The method of claim 1, wherein determining the stored preference comprises determining a stored rule indicating when the second application is to be used when the URL identifier comprises both the first content identifier and the second content identifier.

18. The method of claim 3, wherein determining the stored preference comprises:
   determining that the first viewing application is present on a user device;
   determining that the second viewing application is present on the user device; and
   determining that the stored preference indicates an application preference to use the second viewing application.

19. The method of claim 3, wherein determining the stored preference comprises determining a stored rule indicating when the second viewing application is to be used when the URL identifier comprises both the first content identifier and the second content identifier.

20. The system of claim 11, wherein determining the stored preference comprises:
   determining that the first viewing application is present on the system;
   determining that the second viewing application is present on the system; and
   determining that the stored preference indicates an application preference to use the second viewing application.

21. The system of claim 11, wherein determining the stored preference comprises determining a stored rule indicating when the second viewing application is to be used when the URL identifier comprises both the first content identifier and the second content identifier.

* * * * *